B. ARNOLD.
MACHINE FOR MAKING NETS.
No. 98,461.
Patented Jan. 4, 1870.
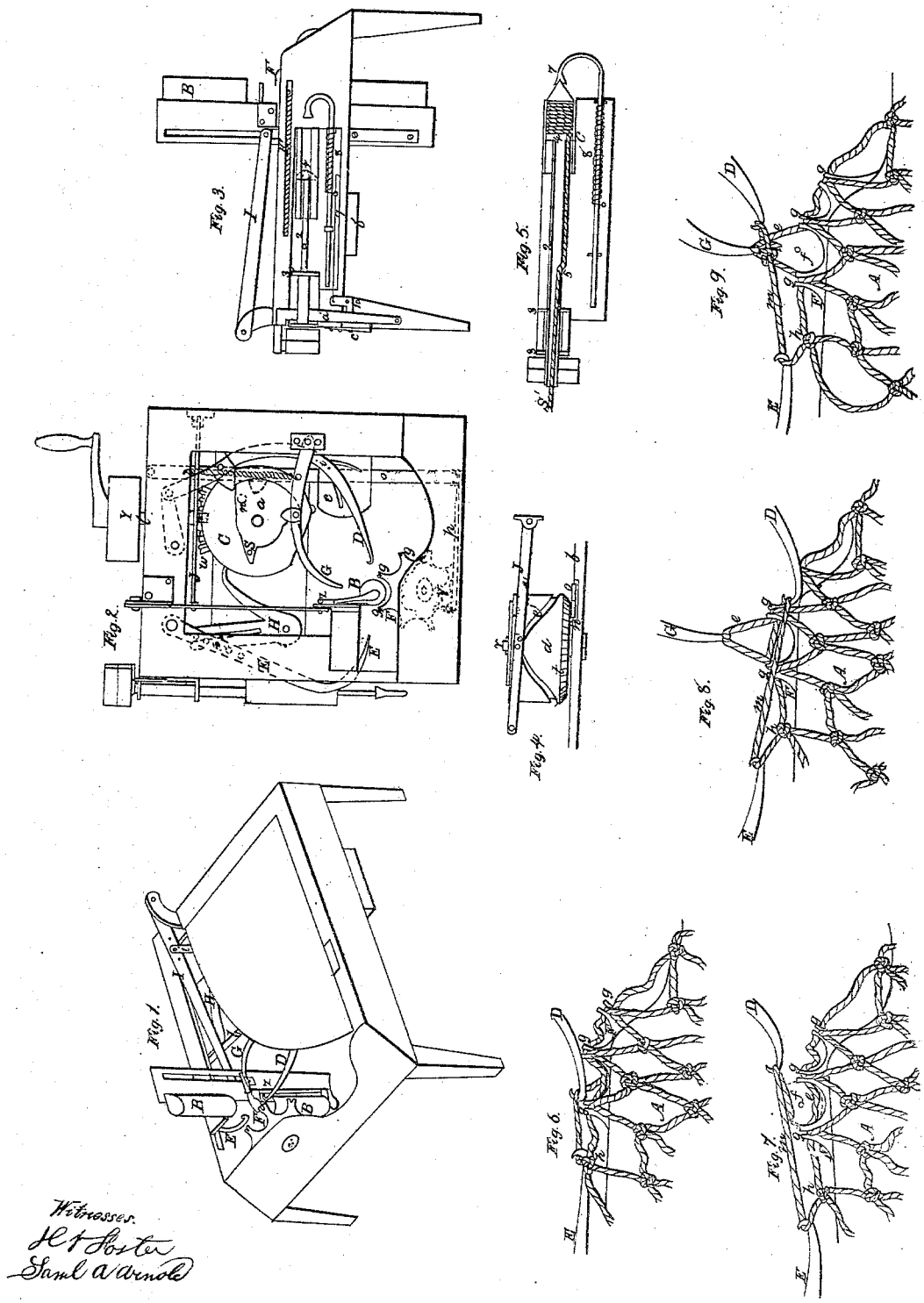
Witnesses.
J. C. Foster
Saml. A. Arnold
Inventor
Benjamin Arnold

United States Patent Office.

BENJAMIN ARNOLD, OF EAST GREENWICH, RHODE ISLAND.

Letters Patent No. 98,461, dated January 4, 1870.

IMPROVEMENT IN MACHINE FOR MAKING NETS.

The Schedule referred to in these Letters Patent and making part of the same.

*To all whom it may concern:*

Be it known that I, BENJAMIN ARNOLD, of East Greenwich, in the county of Kent, and State of Rhode Island, have invented a new and useful Machine for Making Nets and Netting; and I do hereby declare that the following is a full, clear, and correct description of the construction and operation of the same, reference being had to the annexed drawings, making part of this specification, and to the letters of reference marked thereon.

Figure 1 is a perspective view of the machine;
Figure 2 is a top plan, with cover removed;
Figure 3 is a side elevation, showing the shuttle-filler;
Figure 4 is a side view of cam $d$ and levers $J$; and
Figure 5 is a vertical section of shuttle-filler.
Figures 6, 7, 8, and 9 show different stages of the process of making the knot.

The construction is as follows:

A is a frame, having a cross-plate, $b$, holding a stud, $r$, on which the cams $d$ C $a$ turn.

$t$ is a bevel-gear, fastened to the cam $d$, and which gears into bevel-gear $w$, on the driving-shaft $l$, on the outer end of which a crank, pulley, or foot-treadle may be put to drive the machine.

F is a feed-wheel, which holds and presents the knots and meshes in proper shape to form the knot.

The knots of the last row of meshes are put on the prongs of this wheel in succession, while the wheel is standing still for the shuttle and levers to operate, and the wheel is turned at proper intervals by the lever $o$, which is moved by a pin, $n$, in the under side of bevel-wheel $t$. This lever $o$ operates the catch-slide $p$, which catches into the notches $v$, on the back of the feed-wheel F.

Fig. 6 shows the position of the net and levers when beginning a knot. $h$ is the knot last tied, and the feed-wheel F has moved one interval to the left, while the levers E D have moved to the centre over the shuttle $f$. The lever E, to the left, catches the twine $m$ between the last knot, and the shuttle $f$ draws it to the left and into the hook on the end of lever D, which then draws back to the right, as in fig. 7, which shows it ready for the first passage of the shuttle $f$, which passes up between the twine $m$ and the loop $e$, making a turn or half-hitch around the hook on the end of the lever D, which then moves to the front, bringing the half-hitch over the prong $r$ of the feed-wheel F, as seen in fig. 8. The lever G comes forward and catches the loop $e$, and draws it through the half-hitch, fig. 8. Then the shuttle passes down on the other side of twine $m$, between it and the loop $e$. Then the lever D moves toward the lever G, (see fig. 9,) and the lever E moves back to left far enough to draw up the knot, and then comes in to the centre, over the shuttle, to catch the side of the mesh as the feed-wheel brings it over toward the left, which brings us around to the position shown in fig. 6, again to begin a new knot.

Between the lever E and the cam C, from which its motion is derived, is placed a branch lever, H, which has a slot in one arm which receives the pin 1, in lever E, which has several holes in it by which the size of the mesh is regulated; that is, putting the pin 1 in different holes, gives more or less motion to the lever E, and draws out more or less twine before the knot is made.

Cam $d$ moves the lever J up and down, by means of a groove in its periphery, in which a friction-roll works.

Lever J moves lever I, by a short connection, $i$, and lever I is attached to the shuttle-carriage Z.

The lever D is moved by cam $a$, and is governed in its motion by the slotted plate $c$, by a pin in the lever, which moves in the slot in the plate.

Lever G is moved in one direction by a pin, $s$, on cam $a$, and is moved back by a spring, $j$, which draws it as far as the loop caught on its hook will let it, according to size of mesh being made.

Lever $o$, that moves the feed-wheel F, is moved by a pin in under side of gear-wheel $t$, and, like levers D and H, is held up to the cam by a spring; but these levers may be moved like lever J, with a friction-roll in a groove, and the springs dispensed with.

A pulley, $y$, on the driving-shaft $l$, drives the shuttle filler, which consists of a tube, 2, turning in bearings, 3 3, near one end. On the other end of the tube is a head, 4, which is about the diameter of the shuttle, and just fills the shuttle inside, and the head 4 has an opening, 6, through it. The twine $s'$ is brought in through the tube, (see fig. 5,) and out at the opening 5, then through a hole, 6, in the head, and is coiled in the shuttle by the rotatory motion of the head against the bottom of the shuttle, or against the twine in the shuttle.

7 is a presser, to hold the shuttle up against the head, the spring 8 giving the necessary pressure. As the shuttle fills up, the accumulated twine presses the shuttle and presser 7 back, but when full enough, the wire 9, connecting the presser and the knee-lever 10, tips that lever and releases the belt-lever $a'$, so that the spring $c'$ pushes it back and casts off the belt on to the loose pulley. This is to enable the operator to fill a spare shuttle while running the machine, and not be obliged to watch to see when the shuttle is full, to stop the filler.

The operation is as follows:

Motion being given to the shaft $l$, the bevel-gear $w$ drives the cams by the bevel-gear $t$ fastened to them. Cam $d$ moves the lever J up and down by means of a friction-roll, $o'$, on it, which runs in a groove, $e'$, in the cam. Lever J moves the shuttle up and down by means of the carriage $z$ and lever I. Cam $a$ moves the lever D, which is guided in its motion by a slot in the plate $c$, in which the pin $v'$ slides. Cam C moves the levers H and E. A pin in the lower side of cam $d$ moves the feed-lever $o$, which moves the wheel F, as before stated.

Having thus described my netting-machine,

What I claim as my invention, is—

1. The combination of a shuttle with a device for holding and feeding the net, substantially as herein described.

2. The combination of the shuttle with the levers D E G, as herein described, and for the purpose set forth.

3. The arrangement of the shuttle, cam $d$, and cams C and $a$, substantially as specified, and for the purpose set forth.

4. The combination of the lever H and lever E, for the purpose of regulating the size of the mesh, as set forth.

5. The rotating tube, provided with a perforated head, for laying the twine or thread in the shuttle, substantially as set forth.

6. The combination of the shuttle-filler, substantially as described, with the netting-machine herein set forth.

BENJAMIN ARNOLD.

Witnesses:
  N. FOSTER,
  SAML. A. ARNOLD.